US005768986A

United States Patent [19]
Arnold et al.

[11] Patent Number: 5,768,986
[45] Date of Patent: Jun. 23, 1998

[54] CROP BALER BELT SYSTEM

[75] Inventors: Dale B. Arnold; Anson D. Sanford; Chester I. Barber, all of Anthony, Kans.

[73] Assignee: Morrison Co., Inc., Anthony, Kans.

[21] Appl. No.: 550,072

[22] Filed: Oct. 30, 1995

[51] Int. Cl.$^6$ ............................. B30B 5/04; A01F 15/07; A01F 15/18

[52] U.S. Cl. ............................. 100/88; 53/118; 56/341; 198/690.2; 474/92; 474/251

[58] Field of Search ..................... 100/87–89; 53/118, 53/587; 56/341; 198/690.2; 474/92, 237, 251

[56] References Cited

U.S. PATENT DOCUMENTS

| | | | |
|---|---|---|---|
| 1,994,604 | 3/1935 | Bohne | 474/251 |
| 2,430,500 | 11/1947 | Freelander et al. | 474/251 |
| 2,865,214 | 12/1958 | Runton | 474/251 |
| 2,925,165 | 2/1960 | Rake | 198/690.2 |
| 4,426,926 | 1/1984 | Soteropulos et al. | 100/88 |
| 5,080,009 | 1/1992 | Fritz et al. | 100/88 |
| 5,254,045 | 10/1993 | Takahashi et al. | 474/92 |

OTHER PUBLICATIONS

Greenland Sales Brochure for "Variable Chamber Round Balers RV 136/156/186" date unknown—Holland.
New Holland Sales Brochure for "Round Balers 630, 650, 660, " 1991—U.S.
John Deere Sales Brochures for "Round Balers," 1993—U.S.
Hesston Sales Brochure for "Round Balers Models 565, 555, 540, 530, 514," 1993—U.S.
Gehl Sales Brochure for "75 Series Round Balers," 1994—U.S.
Vermeer Sales Brochure for "605 & 604 'K'Series Balers," 1994—U.S.
Massey–Ferguson Sales Brochure for "Round Balers 822, 828," date unknown—Canada.
Deutz–Fahr Sales Brochure for "Rundballenpressen," date unknown—Holland.

Primary Examiner—Stephen F. Gerrity

[57] ABSTRACT

A baler belt system for use primarily in round crop baling machines, includes an elongated elastomeric belt that is adapted for rolling engagement with one or more drive, idler, and tensioner rollers of the type normally used in a round crop baling machine. There are one or more sets of cleaning bars disposed on the inner and outer surfaces of the belt. Each set includes one or more flexible cleaning bars that deform during rolling contact with the various rollers. As the cleaning bars lose contact with the various rollers, they snap back to their original shapes, thereby releasing significant potential energy to loosen crop material that may have accumulated on the exterior surfaces of the rollers. In addition, the sets of cleaning bars function to urge an incoming stream of crop material into a tightly formed spiral without the necessity for an excessively aggressively textured belt surface.

26 Claims, 7 Drawing Sheets

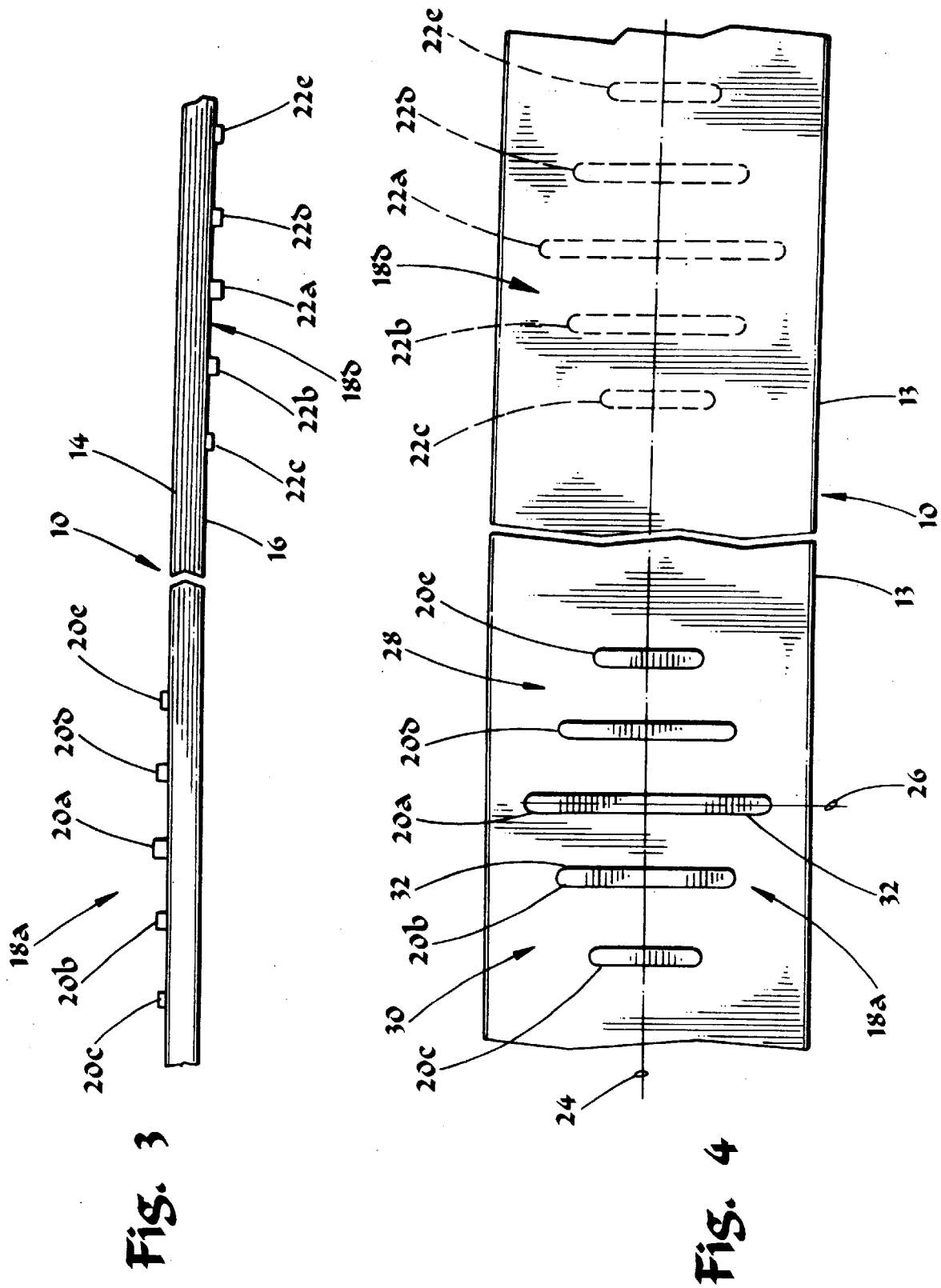

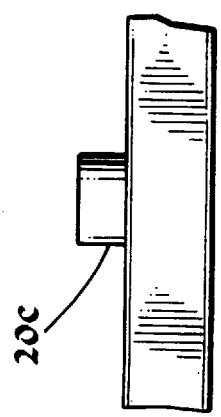 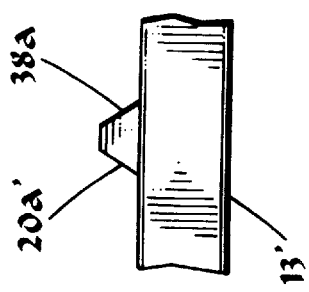 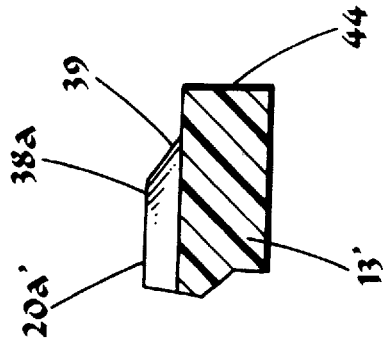 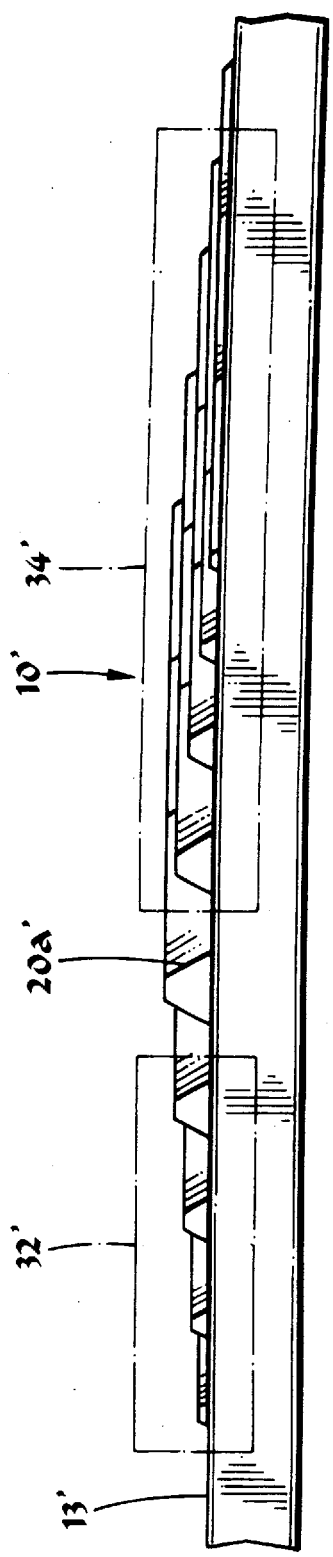

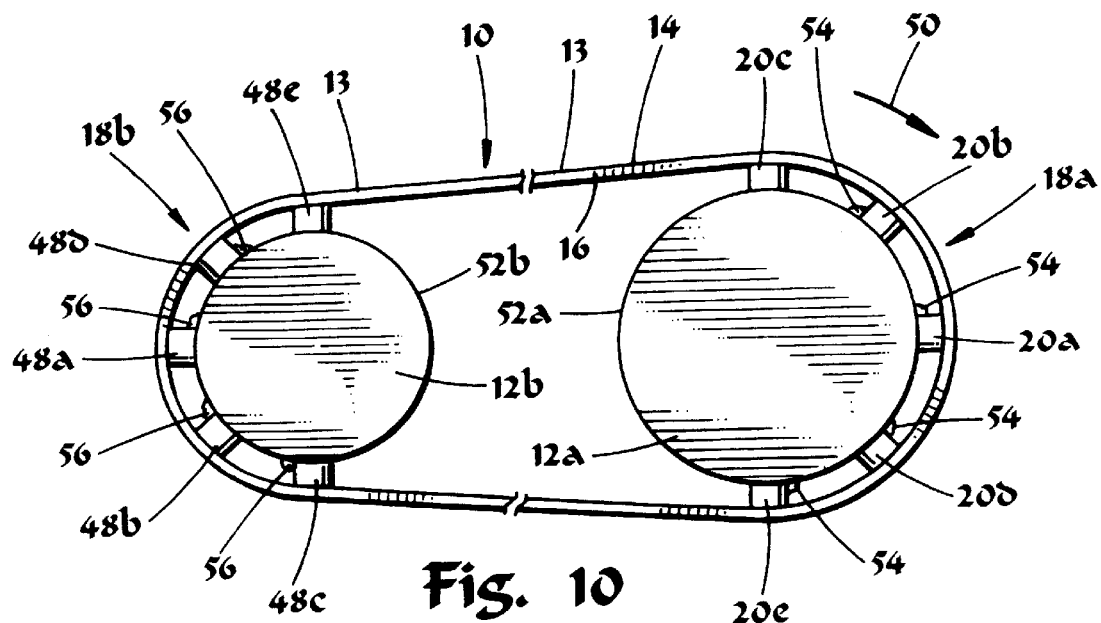
Fig. 10
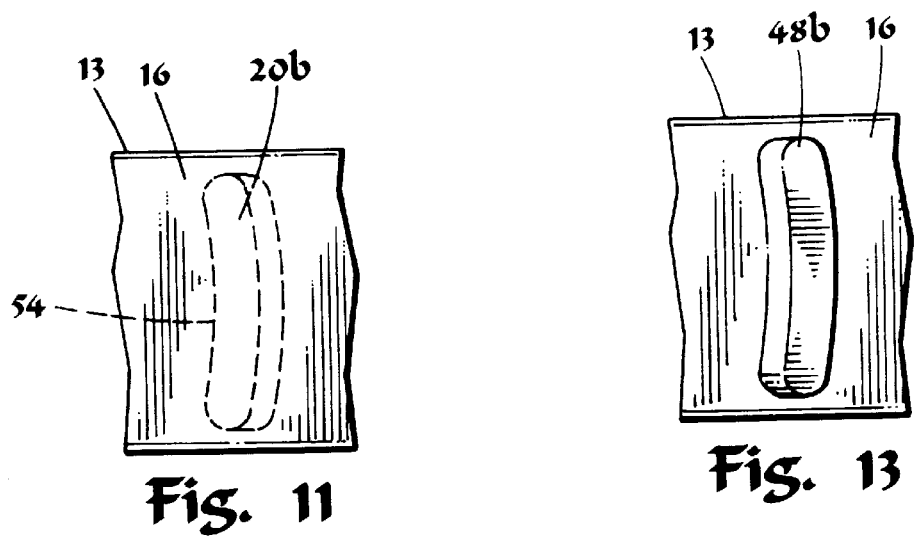
Fig. 11
Fig. 13
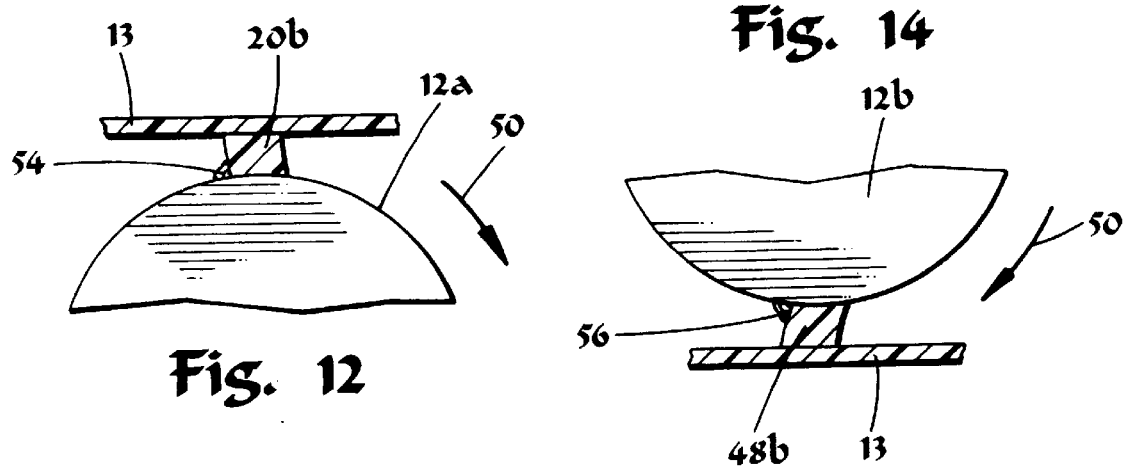
Fig. 12
Fig. 14

CROP BALER BELT SYSTEM

BACKGROUND OF THE INVENTION

1. Field of the Invention

This invention relates generally to conveyor belts and more particularly to elastomeric belts for manipulating crop materials in a crop baling machine.

2. Description of the Related Art

Crop baling machines or balers, typically utilize a moving elongated elastomeric belt to manipulate the crop in one or more ways. In the context of a round hay baler, one or more such elastomeric belts pass over and under a series of drive, idler, and tensioner rollers in a serpentine like arrangement. The belts function to take and form an incoming row of crop into a spiral roll of increasing diameter. In the round hay baler context, as in any crop baler context, there is a recurring problem of crop material, such as stems, becoming trapped between the elastomeric belts and the outer surfaces of the various rollers. The problem may be particularly acute when juice or sugar laden crops must be baled, such as sorghum. Any significant build up of crop material between the rollers and the belts may significantly impair the rollers' ability to move the belts, thereby decreasing the efficiency of the baler.

Existing baler belt systems rely on the incorporation of a textured surface into the exterior of the rollers for removing crop debris from the interface between the rollers and the belts. In one common technique, one or more rows of raised helical metallic scrapers are disposed on the exterior surface of the rollers. The scrapers are typically either cast or forged directly into the exterior of the rollers depending on the production process used to make the rollers, or they are later formed on the rollers by machining. Alternatively, the scrapers are retrofitted to an existing roller by welding or other fastening techniques.

There are a number of disadvantages associated with metallic scrapers. Rubber belts passing over metallic scrapers typically experience accelerated wear. As a result of the helical configuration of metallic scrapers, a given baler belt will have a tendency to move sideways during rotation of the rollers. If the belt moves too far to either side, it may catch on or otherwise interfere with other components in the baler, resulting in potential belt failure or damage to the baler. Sideways movement of a belt may also cause interference between adjacent belts, causing accelerated belt wear or failure. In addition to encouraging unwanted belt movement, metallic scrapers may catch on the fasteners connecting the two ends of a given belt, potentially causing the belt to fail. Finally, metallic scrapers add significant expense to roller fabrication.

In another common technique, a rubbery surface is first applied to the exterior of the rollers. Thereafter, helical grooves are machined into the rubbery surface. In a variation of this technique, a rubbery surface is applied to the exterior of the rollers that is premolded with either grooves or some type of raised texture. Each of these techniques of applying a rubbery surface increases the cost of roller fabrication. Furthermore, the rubbery surfaces will have a tendency to wear much faster than a comparable metallic scraper arrangement. If the rubbery surfaces must be replaced, the entire baler may have to be torn down to extract and replace the rollers.

Existing round hay baler belt systems also have the disadvantage of either providing an inadequate or an excessively textured traction surface to quickly engage and form the initial portion of an incoming row of crop and form it into a tight spiralled core. The texture of the existing round baler belts is designed primarily to accommodate rolling friction between the drive rollers and the belt. However, since existing baler belts have a relatively planar profile, the belt's ability to form a tight initial spiral of crop is dependent primarily on the average coefficient of kinetic friction associated with a row crop in moving contact with the belt's surface. That average coefficient of kinetic friction is a function of the belt's texture and falls off significantly with belt wear. However, if the belt is formed with an excessively aggressive texture, the belt may introduce crop material into the interior of the baler, that is, on the wrong side of the belt, where it may interfere with the components of the baler.

It is an object of the present invention to overcome one or more of the foregoing disadvantages.

SUMMARY OF THE INVENTION

In one aspect of the present invention, a belt system for use with at least one drive roller and at least one idler roller is provided. The belt system includes an elongated elastomeric belt. A set of flexible cleaning bars is disposed on the elongated elastomeric belt for cleaning debris off at least one of the drive roller and the idler roller.

In another aspect of the present invention, a baler belt system for use on a crop baler is provided. The baler belt system includes an elongated elastomeric belt that has an inner surface and an outer surface. A first set of cleaning bars is disposed on the said inner surface, and a second set of cleaning bars is disposed on the outer surface.

In still another aspect of the present invention, a crop baling system is provided. The crop baling system includes a baling machine operable to form round crop bales. The baling machine has a drive roller and an idler roller. An elongated elastomeric belt is in contact with the rollers. The elastomeric belt has an inner surface and an outer surface. A set of flexible cleaning bars is disposed on the elastomeric belt to clean the rollers and to urge the crop into a round bale.

BRIEF DESCRIPTION OF THE DRAWINGS

Other objects and advantages of the invention will become apparent upon reading the following detailed description and upon reference to the drawings in which:

FIG. 3. depicts a portion of the baler belt system of FIG. 1, illustrated in a side view;

FIG. 4 depicts a cleaning bar from FIG. 3, illustrated in a detailed side view;

FIG. 5 is a top view of FIG. 3;

FIG. 7 depicts one of the cleaning bars from FIG. 6, illustrated in a detailed side view;

FIG. 8 is a partial sectional view of FIG. 6, taken at Section 8—8;

FIG. 9 depicts the set of cleaning bars from FIG. 6, illustrated in an end view;

FIG. 10 depicts the baler belt system of FIG. 1, showing only the drive roller and idler roller elements, illustrated in a broken side view;

FIG. 11 depicts a cleaning bar from FIG. 10 interacting with a drive roller, illustrated in a bottom view;

FIG. 12 depicts the cleaning bar of FIG. 11, illustrated in a side view;

FIG. 13 depicts a cleaning bar from FIG. 10 interacting with an idler roller, illustrated in a bottom view;

FIG. 14 depicts the cleaning bar from FIG. 13, illustrated in a side view;

DESCRIPTION OF THE PREFERRED EMBODIMENTS

Figure 1:
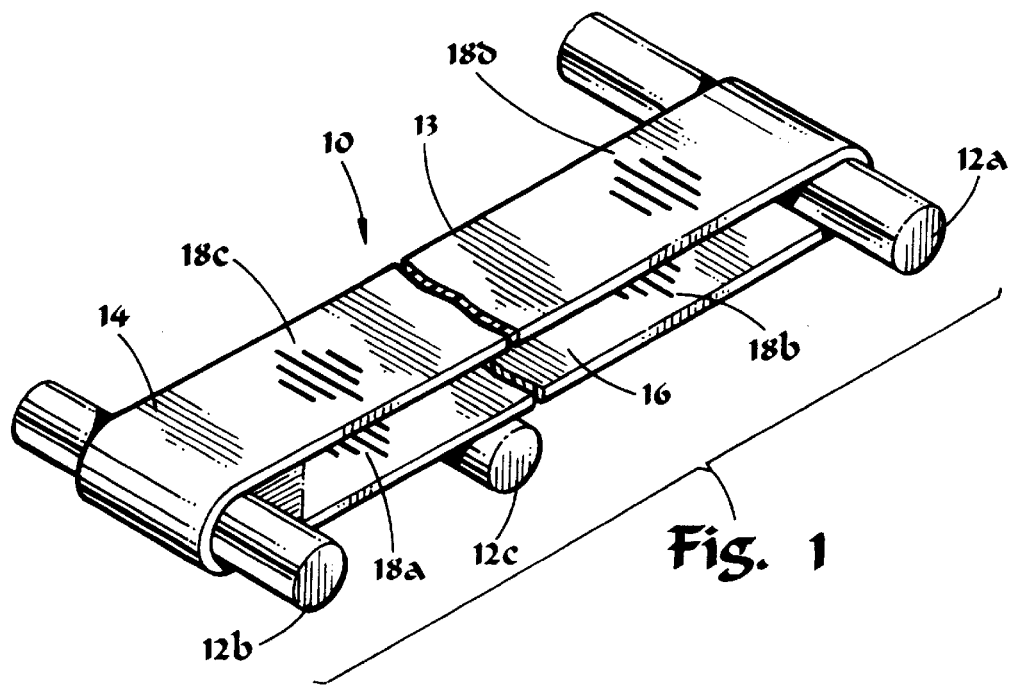
FIG. 1 depicts a baler belt system, illustrated in a broken pictorial view.

Referring now to the drawings, and, in particular to FIG. 1, there is shown a crop baler belt system 10. The baler belt system 10 is intended for use primarily in a round crop baling machine 11 of the type shown in FIG. 2, which has one or more drive rollers 12a, one more idler rollers 12b, and one or more tensioner rollers 12c. For simplicity of illustration, FIG. 1 depicts the baler belt system 10 in a broken pictorial view in conjunction with a single drive roller 12a, a single idler roller 12b, and single tensioner roller 12c. However, it should be understood that the crop baling machine 11 will ordinarily use two sets of four to eight belt systems 10 placed side by side. It should be further understood that the baler belt system 10 may be used on other types of crop baling machines, such as those that utilize either a single set of several belt systems 10 placed side by side or multiple sets of several belt systems placed side by side.

The baler belt system 10 generally comprises an elongated flexible belt 13 which has an outer surface 14 for engaging the crop material to be baled and an inner surface 16 for rolling engagement with the rollers 12a and 12b that is relatively parallel to the outer surface 14 at any given point along the belt 13. There are several cleaning bars disposed on the outer and inner surfaces 14 and 16 of the belt 13. The bars on the inner surface 16 are segregated into one or more sets 18a and 18b that are spaced apart on the belt 13 longitudinally. Similarly, the bars on the outer surface 14 are segregated into one or more sets 18c and 18d that are spaced apart on the belt 13 longitudinally. The detailed structure and operation of the bars and sets 18a, 18b, 18c, and 18d will be discussed more below.

It should be understood that the particular number and spacing of, as well as the number of bars in, the sets 18a, 18b, 18c, and 18d are matters of discretion on the part of the designer. Indeed, there may be applications where it is desirable to fashion a belt 13 with a single set composed of a single cleaning bar disposed on either the inner surface 16 or the outer surface 14 or even a single set composed of a single bar disposed on the inner surface 16 and a single set composed of a single bar disposed on the outer surface 14.

The baler belt 13 and the sets of cleaning bars 18a, 18b, 18c, and 18d are preferably composed of a thermoset elastomer with a styrene-butadiene rubber and natural rubber blend, or other blends with similar characteristics. The sets of cleaning bars 18a, 18b, 18c, and 18d may be molded integrally with the belt 13 or may be alternatively attached thereto by other fastening methods, such as vulcanization.

The detailed structure of the sets of cleaning bars 18a, 18b, 18c and 18d may be understood by reference to FIGS. 3, 4, and 5, which are, respectively, a side view and a top view of a portion of the belt system 10, and a detailed side view of one of the cleaning bars 20c. In FIG. 4, the set 18d is shown in phantom since it is disposed on the outer surface 14 of the belt 13. Since the sets 18a, 18b, 18c and 18d of cleaning bars for a given belt system 10 will ordinarily be substantially identical, the following discussion is focused primarily on the set 18a.

The set 18a includes generally parallel cleaning bars 20a, 20b, 20c, 20d and 20e. Similarly the set 18d includes generally parallel cleaning 22a, 22b, 22c, 22d and 22e. All of the cleaning bars 20a, 20b, 20c, 20d and 20e in the set 18a are disposed generally perpendicularly to the longitudinal center line 24 of the belt 13. The bars 20a, 20b, 20c, 20d and 20e share several structural similarities. Each has a generally rectangular profile, a corresponding approximate longitudinal center line 26, and rounded edges which function to reduce the potential for stress risers.

The central cleaning bar 20a is flanked on one side by a subset 32 of secondary bars 20b and 20c and on the opposite side by another subset 34 of secondary bars 20d and 20e. Cleaning bars 20c and 20e may be termed end bars and bars 20b and 20d may be termed intermediate bars. While the cleaning bars 20a, 20b, 20c, 20d and 20e all have approximately the same width, their respective lengths and heights differ as shown in the figures. The central bar 20a is typically the longest bar in the set 18a while the cleaning bars in a given subset, for example, 32, have lengths that are less than the length of the central bar 20a and that diminish with distance from the central bar 20a. For example, the cleaning bar 20b is shorter than the central bar 20a and the cleaning bar 20c is shorter than the cleaning bar 20b. Corresponding cleaning bars from the two subsets 32 and 34 may have identical lengths, such as 20b and 20d; however, they need not. The lengths of the cleaning bars 20b, 20c, 20d, and 20e are deliberately selected to diminish with distance from the central bar 20a in order to reduce the shock imparted to drive and idler rollers 12a and 12b as will be discussed more fully below.

The spacing between any two adjacent cleaning bars, such as 20a and 20b, is preferably substantially the same as the spacing between any two other adjacent cleaning bars, for example 20d and 20e. The spacing between any two adjacent bars, for example 20a and 20b, may be defined by the distance between any two convenient reference points on the bars 20a and 20b, such as the center lines 26 of the bars 20a and 20b or adjacent surfaces 28 and 30.

As seen in FIG. 3, the heights of the bars in a given set, such as 18a, vary in relation to their position from the central bar 20a. The central bar 20a is the tallest bar in the set 18a. The heights of the bars in the subset 32 diminish with distance from the central bar 20a. For example, the cleaning bar 20b has a lower height than the central bar 20a and the end cleaning bar 20c has a lower height than the intermediate cleaning bar 20b. The cleaning bars 20b, 20c, 20d, and 20e are configured with a diminishing height in relation to distance from the central bar 20a in order to reduce the shock imparted on the rollers as discussed more fully below. In a preferred embodiment, the central bar 20a has a height of approximately 4–5 millimeters and the end bar 20c has a height of approximately 1 millimeter. However, it should be understood that the exact height of the bars in a given set is a matter of discretion. Similarly, the distance between the cleaning bars that are located most remote from the center bar 20a, for example, bars 20c and 20e is preferably one-half the circumference of the largest roller to be encountered by the belt system 10.

Although the spacing between the bars is preferably uniform, it should be understood that the number and spacing for a given sub-set of cleaning bars, for example, 32, is not fixed, but may be varied by the designer.

Figure 6:
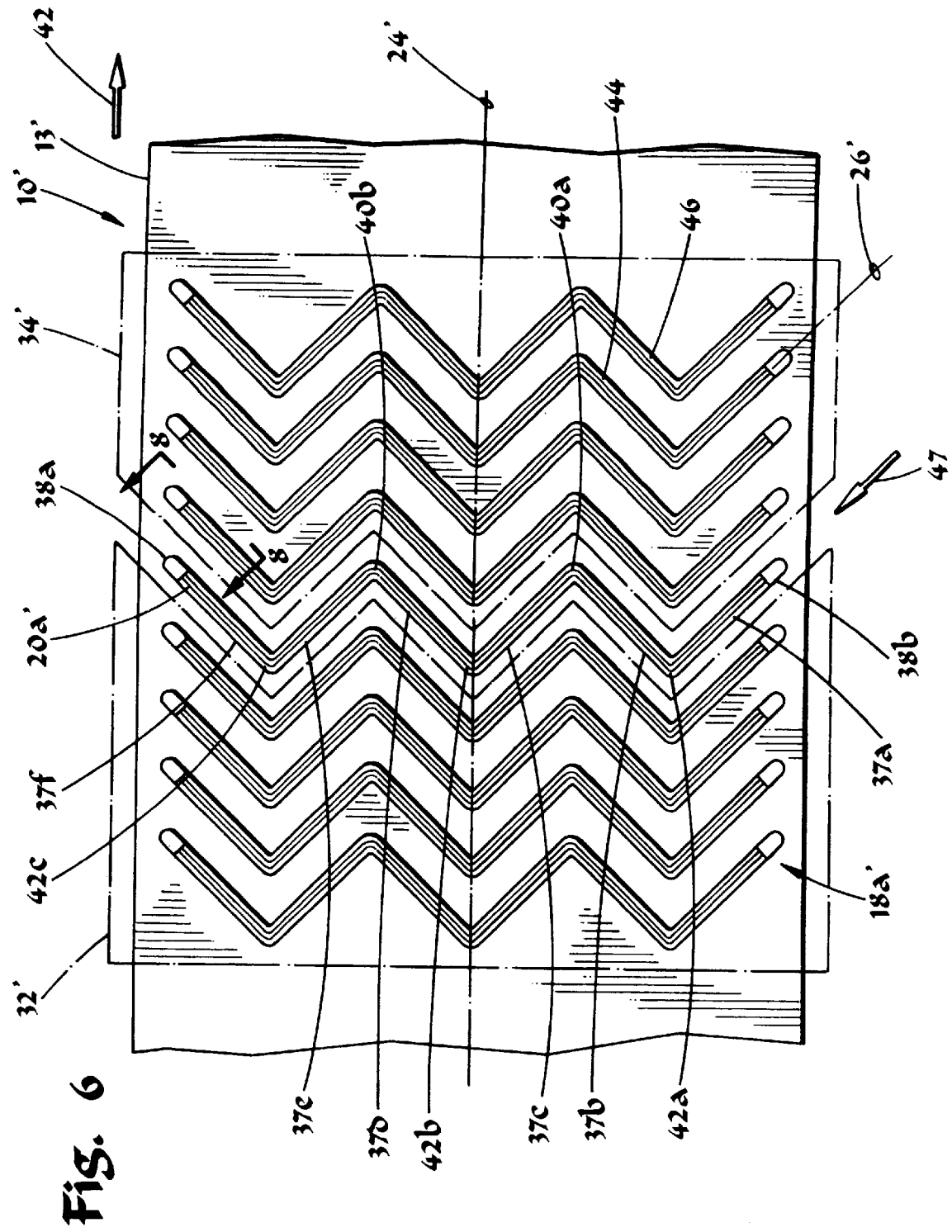
FIG. 6 depicts an alternative configuration for a set of cleaning bars, illustrated in a top view.

The cleaning bars need not be rectangular. FIG. 6 is a top view of an alternative configuration for a set of cleaning bars. In this embodiment, the set 18a' includes several generally parallel cleaning bars disposed generally perpendicularly to the center line 24' of the belt system 10'. The set 18' is composed of a central bar 20a' that is straddled to one side by a subset 32' of cleaning bars and to the other side by another subset 34' of cleaning bars. The subsets 32' and 34' are delineated by the dashed boxes 32' and 34'.

The following discussion of the structure of the central bar 20a' is exemplary of the other cleaning bars in the set 18a'. The central bar 20a' is composed of a series linear segments 37a, 37b, 37c, 37d, 37e, and 37f connected end to end to form a zigzag pattern such that the ends 38a and 38b of the central bar 20a' and the two peaks 40a and 40b defined by the intersections of the segments 37b and 37c and 37d and 37e point generally in the direction of travel of the belt 13' indicated by the arrow 42. Conversely, the peaks 42a, 42b, and 42c on the cleaning bar 20a' defined by the intersections of the segments 37a and 37b, 37c and 37d, and 37e and 37f point in the opposite direction. The zigzag pattern of the cleaning bar 20a' provides a greater surface area for a given width of belt to act on crop material. The cleaning bar 20a' has a generally trapezoidal profile as shown in FIG. 7, which is an end view of the end 38a of the central bar 20a'. As shown in FIG. 8, which is a partial sectional view of the belt 13' taken at section 8—8, the end 38a of the central bar does not extend to the side surface 44 of the belt 12'. The same is true for the end 38b. The ends 38a and 38b of the central bar 20a' have a downward sloping profiled surface 39. The sloping surface 39 serves several functions. First, for a given bar, such as the central bar 20a', that is disposed on the inner surface 16, the sloped surface 39 reduces the potential for the ends 38a and 38b catching and carrying particularly long crop stems that may be redeposited at some other undesirable location in the machine 11. Second, the sloped surface 39 reduces the possibility that the ends 38a and 38b will catch the net wrap or twine used to secure the crop in baled form.

The central bar 20a' preferably has approximately the same length as all the other bars in set 18a', whether that length is measured as the linear distance between the ends 38a and 38b or as the combined lengths of the segments 37a, 37b, 37c, 37d, 37e, and 37f that make up the bar 20a'.

The spacing between any two adjacent bars in the set 18a' is preferably substantially the same as the spacing between any two other adjacent bars in the set 18a'. That spacing may be defined by the distance between any two convenient reference points on adjacent bars, such as the center lines 26' or opposing surfaces on adjacent bars such as 44 and 46.

As seen in FIG. 9, which is an oblique front view of FIG. 6 viewed from the direction indicated by the arrow 47, the heights of the bars in set the 18a' vary in relation to their position from the central bar 20a' in the same fashion as in the previously described preferred embodiment. As with the previously disclosed preferred embodiment, the number and spacing of cleaning bars for a given subset of bars, for example 32', is not fixed but may be varied by the designer. Similarly, the distance between the cleaning bars that are most remote from the central bar 20a' is preferably one-half the circumference of the largest roller to be encountered by the belt system 10'.

The cleaning function of the baler belt system 10 may be understood by reference to FIG. 10, which is a side view of FIG. 1 that is highly exaggerated to illustrate the operation of the cleaning bars 20a, 20b, 20c, 20d, and 20e. FIG. 10 shows the belt system 10 and particularly the interaction of the cleaning bars 20a, 20b, 20c, 20d, and 20e of the set 18a with the drive roller 12a and the interaction of the cleaning bars 48a, 48b, 48c, 48d, and 48e from the set 18b with the idler roller 12b. The length and serpentine configuration of the belt 13 necessitates that the belt 13 be shown broken. The direction of rotation of the drive and idler rollers 12a and 12b is indicated the by arrow 50. Assume for the purpose of illustration that there is a layer of crop material formed on the exterior surfaces 52a and 52b of the drive and idler rollers 12a and 12b. When the belt 13 is in the position relative to the drive and idler rollers 12a and 12b as shown in FIG. 1, there will be generally uniform rolling contact between the inner surface 16 of the belt 13 and the exterior surfaces 52a and 52b of the drive and idler rollers 12a and 12b, subject to occasional slippage associated with imperfections in the belt 13 and efficiency losses associated with the buildup of crop material on the exterior surfaces 52a and 52b. However, when the belt 13 has moved around such that the set 18a encounters the drive roller 12a, the exterior surface 52a will begin to lose contact with the inner surface 16, thereby causing significant slippage between the drive roller 12a and the belt 13. The cleaning bar 20e will be the first to encounter the exterior surface 52a. When the belt 13 reaches the position shown in FIG. 10, the amount of slippage between the exterior surfaces 52a and 52b and the belt 13 will be at its maximum.

As the slippage action begins, several important interactions between the drive roller 12a and the set of cleaning bars 18a occur. The kinetic friction between the cleaning bars 20a, 20b, 20c, 20d, and 20e and the exterior surface 52a causes the bars 20a, 20b, 20c, 20d, and 20e to deform. The nature of the deformation is depicted in an exaggerated manner in FIGS. 11 and 12, which are, respectively, views of the cleaning bar 20c viewed from below and from the side. The deformation is made possible by the elastomeric character of the cleaning bars 20a, 20b, 20c, 20d, and 20e. As the bars 20a, 20b, 20c, 20d, and 20e deform, they store a significant amount of potential energy.

In addition to causing the deformation of the cleaning bars 20a, 20b, 20c, 20d, and 20e, the slippage action of the drive roller 12a will cause crop material accumulated on the exterior surface 52a to accumulate at the trailing edges of the cleaning bars as indicated at 54. As the cleaning bars 20a, 20b, 20c, 20d, and 20e continue to rotate around the drive roller 12a, additional crop material will accumulate as indicated at 54. As the cleaning bars 20a, 20b, 20c, 20d, and 20e successively lose contact with the exterior surface 52a, they will snap back into their original configurations and release their stored potential energy, thereby exerting a significant shearing force on any crop material accumulating at 54. This force loosens the accumulated crop material from the exterior surface 52a.

When the cleaning bars 20a, 20b, 20c, 20d, and 20e are in contact with the drive roller 12a, the bars 20a, 20b, 20c, 20d, and 20e will deform in the direction of rotation of the drive roller 12a, and accordingly will snap back into their initial positions in a direction that is opposite to the direction of rotation of the drive roller 12a.

The interaction between the cleaning bars 48a, 48b, 48c, 48d, and 48e of the set 18b is remarkably similar to the interaction of the bars 20a, 20b, 20c, 20d, and 20e with the drive roller 12a, though in an opposite sense. However, the same cleaning effect is achieved. The deformation of the cleaning bar 48*b* due to its interaction with the external surface 52*b* of the drive roller 12*b* is depicted in FIGS. 12 and 13, which are, respectively, the cleaning bar 48*b* viewed from above and from the side in a detailed view. As the bars 48*a*, 48*b*, 48*c*, 48*d*, and 48*e* encounter the exterior surface 52*b* of the idler roller 12*b*, any crop material accumulated on the exterior surface 52*b* will congregate at the leading edges of the cleaning bars 48*a*, 48*b*, 48*c*, 48*d*, and 48*e* at 56. As the cleaning bars 48*a*, 48*b*, 48*c*, 48*d*, and 48*e* successively lose contact with the exterior surface 52*b*, they release their stored potential energy and snap back into their original shapes, thereby exerting significant shearing forces on the accumulated crop material.

Figure 2:
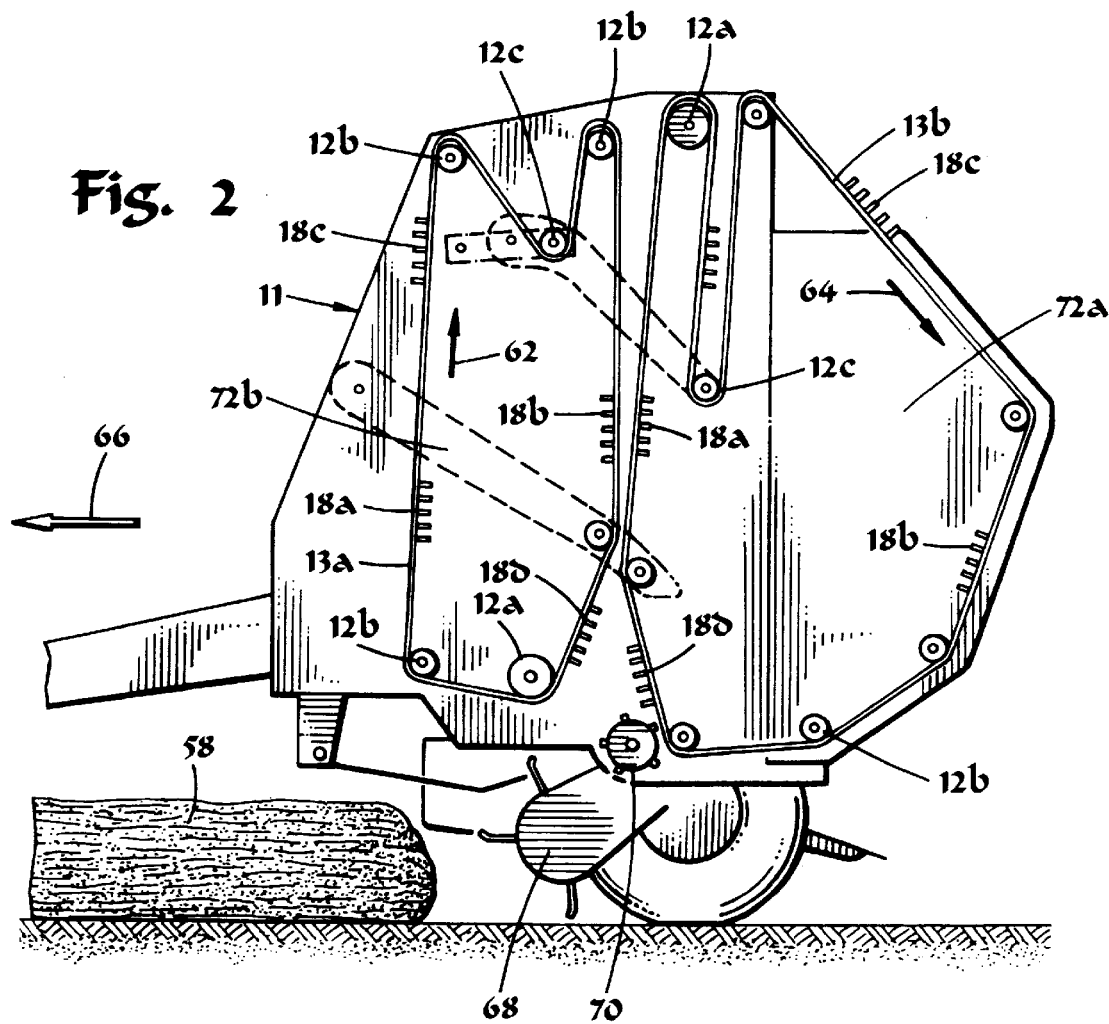
FIG. 2. depicts a round crop baling machine, illustrated in a side view.

The cleaning of the tensioner roller 12*c* is accomplished in the same manner as the cleaning of the idler roller 12*b*. As shown in FIG. 1 and FIG. 2, cleaning bars 18*c*, 18*d* located on the outside surface 14 contact the tensioner roller 12*c*. The cleaning bars 18*c*, 18*d* will deflect, accumulate crop material, and snap back releasing their stored potential energy to exert shearing forces on the accumulated crop material in the same manner as thoroughly described above for the idling roller 12*b*.

Figure 15:
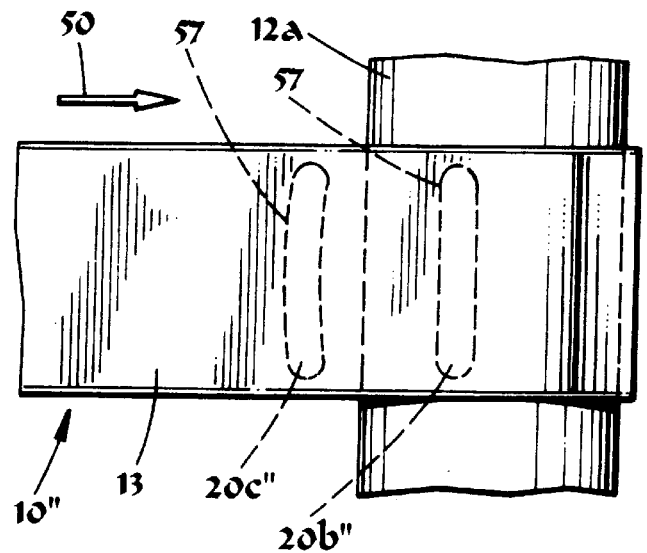
FIG. 15 depicts an alternative baler belt system that includes concave shaped cleaning bars, illustrated in a partial top view.

The amount of shearing force imparted on the accumulated crop material, will be a function of a number of parameters, such as the bulk modulus of the cleaning bar and belt materials, the belt tension, the dimensions of a given bar, and the configuration of a given bar. For example, one or more of the cleaning bars may be preformed in a concave shape to maintain a pretension in the bars that would enable the bars to more readily resist deformation, and thus store more potential energy. FIG. 15 shows a top view of a portion of a baler belt system 10" which incorporates preformed concave shaped bars. For simplicity of illustration, only the bars 20*b*" and 20*c*" are shown. The direction of movement of the belt 13 is indicated by the arrow 50 In FIG. 15, the belt 13 is shown positioned relative to the drive roller 12*a*(shown partially in phantom) so that the concave shaped bar 20*b*" has already encountered the drive roller 12*a* and the concave shaped bar 20*c*" is about to interact with the drive roller 12*a*. The convex sides 57 of the bars 20*b*" and 2O*c*" point opposite to the direction of rotation of the drive roller 12*a*. As shown, FIG. 15, the rolling friction between bar 20*b*" and the drive roller 12*a* causes the bar 20*b*" to straighten, thereby storing potential energy.

As noted above, the heights and lengths of the bars in a given set, for example 20*a*, 20*b*, 20*c*, 20*d*, and 20*e* in the set 18*a*, are varied to reduce the shock associated with the exterior surface 52*a* of the drive roller 12*a* losing substantial rolling contact with the inner surface 16 of the belt 13. It is believed that the shock of such interactions will be minimized by introducing a gradual slippage between the exterior surface 52*a* of the drive roller 12*a* and the inner surface 16 of the belt 13. This graduation in slippage is facilitated by making the height of the bars 20*a*, 20*b*, 20*c*, 20*d*, and 20*e* vary as disclosed above. In this way, the drive roller 12*a* and the inner surface 16 change from a relatively uniform rolling contact to a gradually increasing slippage condition as the exterior surface 52*a* successively encounters the cleaning bars 20*e*, 20*d*, 20*a*, 20*b*, and 20*c*. Conversely, as the exterior surface 52*a* successively loses contact with the cleaning bars, the successively lower heights of the cleaning bars 20*b* and 20*c* will enable the drive roller to more smoothly transition into a generally uniform rolling contact with the inner surface 16 of the belt 13, thereby reducing the shock that would ordinarily be associated with a rapid transition from a high slippage condition to a generally uniform rolling contact condition.

Figure 16:
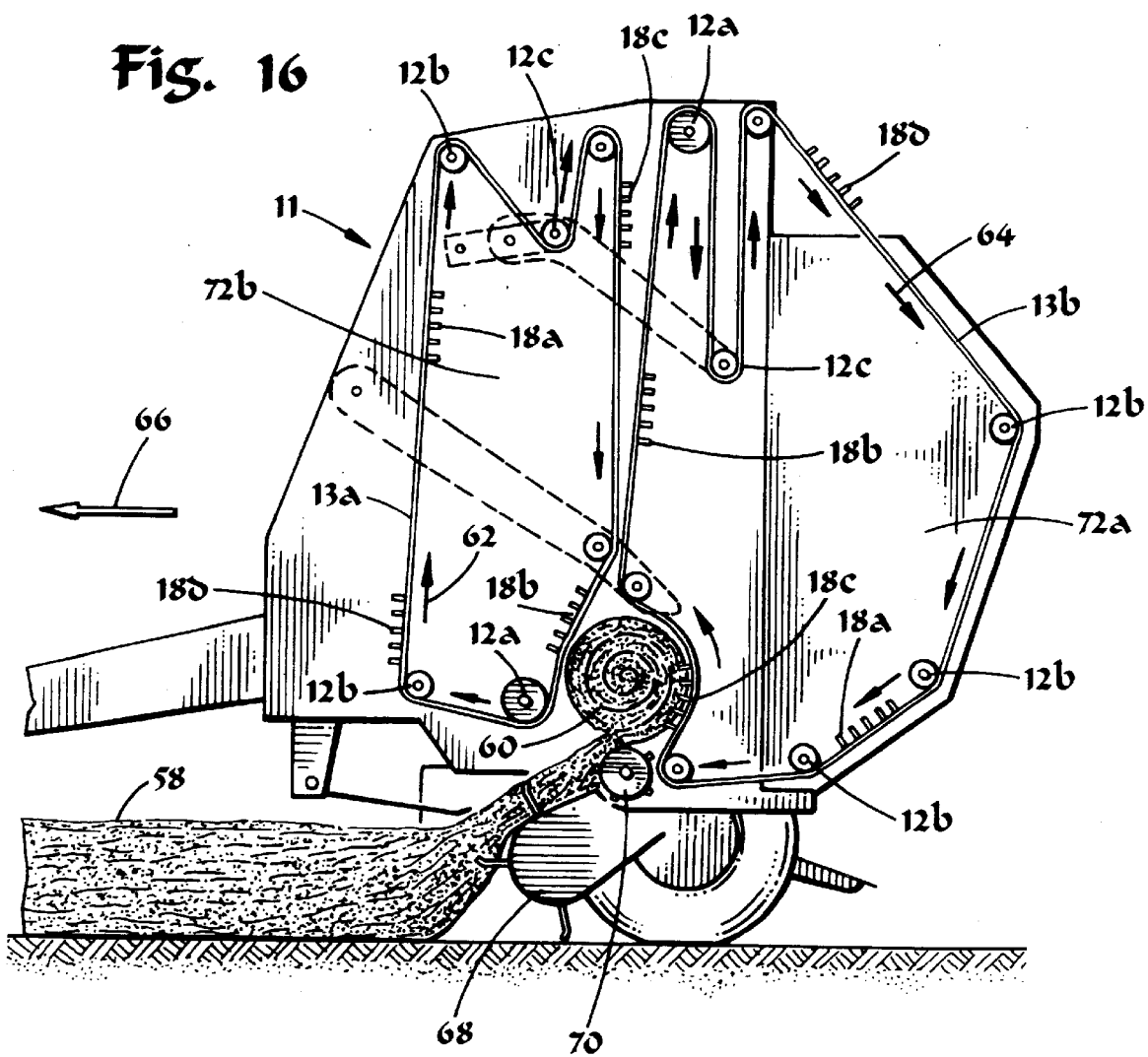
FIG. 16 depicts the baling machine of FIG. 2 following the initial formation of a spiraled crop bale, illustrated in a side view.
Figure 17:
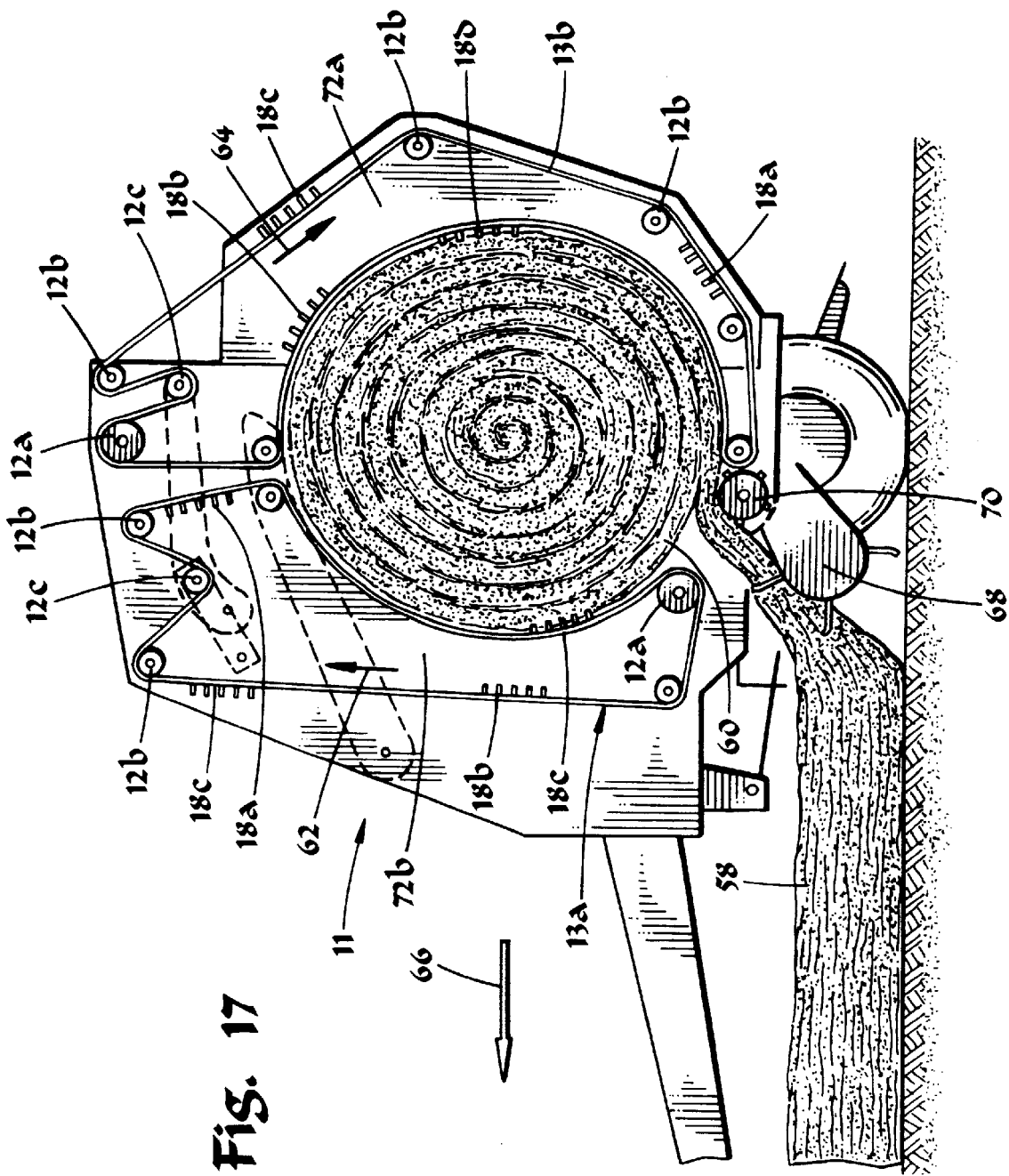
FIG. 17 depicts the baling machine of FIG. 16 when the spiral crop bale is fully formed, illustrated in a side view.

The ability of the baler belt system 10 to facilitate the formation of a round crop bale in a typical round crop baling machine may be understood by reference to FIG. 2 and to FIGS. 16 and 17, which are, respectively, highly simplified side views of a typical baler machine 11 just prior to interaction with a row of crop material 58, at the initial stages of formation of a bale 60 of the crop material 58, and at the final formation of the bale 60 of the crop material 58. The baling machine 11 in FIGS. 2, and 16–17 is depicted with two baler belts 13*a* and 13*b* of the type previously described and numbered as 13. However, as noted above, it should be understood that such a baling machine 11 will ordinarily have two sets of four to six such baler belts placed side by side. As described above, the belts 13*a* and 13*b* are disposed around one or more drive rollers 12*a*, idler rollers 12*b*, and tensioner rollers 12*c*, and the belts 13*a* and 13*b* have one or more sets 18*a*, 18*b*, 18*c*, and 18*d* of cleaning bars. The directions of rotation of the belts 13*a* and 13*b* are indicated, respectively, by the arrows 62 and 64. The direction of linear movement of the baling machine 11 is indicated by the arrow 66.

As the baling machine 11 encounters the row of crop material 58, the clockwise (as viewed from FIGS. 2, and 16–17) rotating header 68 on the baling machine 11, introduces the row of crop material 58 into the machine as shown in FIGS. 2 and 16. As the crop material 58 passes the header 68, it encounters a clockwise (as viewed from FIGS. 2, and 16–17) rotating auger 70, which, in turn, propels the crop material 58 into the outer surface 14 of the belt 13*b*. The clockwise rotation of the belt 13*b* will urge the crop material 58 into a spiral 60.

In existing baler belt systems, this initial spiral formation is accomplished by the interaction of the textured surface of the belt with the crop material 58. As noted above, if the surface of the belt in an existing system is too aggressively textured, there will be a tendency to introduce unwanted crop material into the cavities 72*a* and 72*b* inside the belts 13*b* and 13*a*. However, in the embodiments disclosed herein, the initial spiral formation is facilitated by the sets of cleaning bars 18*c* and 18*d*, which function to readily engage and form the incoming crop material 58 into a tight spiral 60 as shown in FIG. 16. As the spiral 60 grows in diameter, it will eventually contact the exterior surface 14 of the clockwise rotating belt 13*a*. The interaction of the spiral 60 and the sets of cleaning bars 18*c* and 18*d* on belt 13*a* will further encourage the formation of a tight spiral 60 as shown in FIGS. 16 and 17. The presence of the sets of cleaning bars 18*c* and 18*d* facilitate the formation of a tight spiral 60 without the need for an overly aggressively textured belt surface that poses the risk of introducing unwanted crop material into the cavities 72*a* and 72*b*. Thus, as noted above, the sets of cleaning bars 18*a*, 18*b*, 18*c*, and 18*d* on the belts 13*a* and 13*b* not only facilitate the formation of a tight spiral 60 of crop material 58, but simultaneously remove debris from the exterior surfaces of the various rollers 12*a*, 12*b*, and 12*c*.

Although a particular detailed embodiment of the apparatus has been described herein, it should be understood that the invention is not restricted to the details of the preferred embodiment, and many changes in design, configuration, and dimensions are possible without departing from the spirit and scope of the invention. For example, whereas the foregoing preferred embodiments are described in the context of a round crop baler machine, it should be understood to those skilled in the art that the baler belt system 10 may be utilized in a large variety of conveyor belt systems where it is desired to remove debris that may accumulate on the drive, idler, and tensioner rollers, comprising:

What is claimed is:

1. A belt system for use with a plurality of rollers, comprising:
   an elongated elastomeric belt having an inner surface and an outer surface;
   a set of flexible cleaning bars disposed on said inner surface for cleaning debris off at least one of said rollers; and
   a portion of said elongated elastomeric belt devoid of said cleaning bars.

2. The belt system of claim 1, said plurality of rollers comprising at least three rollers, at least one of said rollers contacting said outer surface, wherein a second set of flexible cleaning bars is disposed on said outer surface.

3. The belt system of claim 1, wherein said set of cleaning bars comprises:
   a central bar;
   a first subset of secondary bars disposed on said belt to a first said central bar;
   and second subset of secondary bars disposed to a second and opposite side of said central bar.

4. The belt system of claim 3, wherein said first subset of secondary bars comprises a first end bar and said second subset of secondary bars comprises a second end bar.

5. The belt system of claim 4, wherein said first subset comprises:
   said first end bar;
   and at least one intermediate bar disposed between said first end bar and said central bar; and wherein
   said second subset comprises said second end bar,
   and at least one said intermediate bar between said second end bar and said central bar.

6. The belt system of claim 1 wherein each bar of said set of cleaning bars is in a zigzag pattern.

7. A belt system for use with a plurality of rollers, comprising an elongated elastomeric belt having an inner surface and an outer surface; a set of flexible cleaning bars disposed on said elongated elastomeric belt for cleaning debris off at least one of said rollers; and a portion of said elongated elastomeric belt devoid of said cleaning bars, wherein said set of cleaning bars comprises:
   a central bar;
   a first subset of secondary bars disposed on said belt to a first side of said central bar, said first subset of secondary bars comprising a first end bar and at least one intermediate bar disposed between said first end bar and said central bar; and
   a second subset of secondary bars disposed to a second an opposite side of said central bar, said second subset of secondary bars comprising a second end bar and at least one said intermediate bar disposed between said first end bar and said central bar,
   wherein the length and height of a first given bar from said first subset is less than the lengths of the said bars from said first subset that are disposed closer to said central bar than said first given bar and greater than the lengths of said bars from said first set that are disposed farther from said central bar than said first given bar;
   and the length and height of a second given bar from said second subset is less than the lengths of the said bars from said second subset that are disposed closer to said center bar than said second given bar and greater than the lengths of said bars from said second subset that are disposed farther from said center bar than said second given bar.

8. A baler belt system for use on a crop baler, comprising:
   an elongated elastomeric belt having an inner surface and an outer surface;
   a first set of cleaning bars disposed on said inner surface;
   and a portion of said inner surface devoid of said cleaning bars.

9. The baler belt system of claim 8, wherein said first set of cleaning bars comprises:
   a central bar having a pair of opposing sides;
   a first subset of secondary bars disposed on said belt to a first side of said central bar;
   and a second subset of secondary bars disposed to a second and opposite side of said central bar.

10. The baler belt system of claim 9, wherein said first subset of secondary bars comprises a first end bar and said second subset of secondary bars comprises a second en bar.

11. The baler belt system of claim 10, wherein said first subset comprises:
    said first end bar;
    and a first intermediate bar disposed between said first end bar and said central bar; and wherein
    said second subset comprises said second end bar,
    and a second intermediate bar between said second end bar and said central bar.

12. The baler belt system of claim 11, wherein
    the length and height of a first given bar from said first subset is less than the lengths of the said bars from said first subset that are disposed closer to said central bar than said first given bar and greater than the lengths of said bars from said first set that are disposed farther from said central bar than said first given bar;
    and the length and height of a second given bar from said second subset is less than the lengths of the said bars from said second subset that are disposed closer to said center bar than said second given bar and greater than the lengths of said bars from said second subset that are disposed farther from said center bar than said second given bar.

13. The baler belt system of claim 8, wherein each bar of said first set of cleaning bars is in a zigzag pattern.

14. The baler belt system of claim 8, including a second set of flexible cleaning bars disposed on said outer surface.

15. The baler belt system of claim 14, wherein said second set of cleaning bars comprises:
    a central bar having a pair of opposing sides;
    a first subset of secondary bars disposed on said belt to a first side of said central bar;
    and a second subset of secondary bars disposed to a second and opposite side of said central bar.

16. The baler belt system of claim 15, wherein said first subset of secondary bars comprises a first end bar and said second subset of secondary bars comprises a second end bar.

17. The baler belt system of claim 16, wherein said first subset comprises:
    said first end bar;
    and a first intermediate bar disposed between said first end bar and said central bar; and wherein
    said second subset comprises said second end bar,
    and a second intermediate bar between said second end bar and said central bar.

18. The baler belt system of claim 17, wherein
    the length and height of a first given bar from said first subset is less than the lengths of the said bars from said first subset that are disposed closer to said central bar than said first given bar and greater than the lengths of said bars from said first subset that are disposed farther from said center bar than said first given bar;

and the length and height of a second given bar from said second subset is less than the lengths of the said bars from said second subset that are disposed closer to said central bar than said second given bar and greater than the lengths of said bars from said second subset that are disposed farther from said central bar than said second given bar.

19. The baler belt system of claim 14, wherein each bar of said sets of cleaning bars is in a zigzag pattern.

20. A crop baling system, comprising:

a baling machine operable to form round crop bales, said baling machine having a plurality of rollers;

an elongated elastomeric belt being in contact with said rollers, said elastomeric belt having an inner surface and an outer surface;

at least one set of flexible cleaning bars disposed on said inner surface for performing at least one of the functions of cleaning said rollers and urging said crop into a round bale; and a portion of said elongated elastomeric belt devoid of said cleaning bars.

21. The crop baling system of claim 20, said plurality of rollers comprising at least three rollers, at least one of said rollers contacting said outer surface, wherein a second set of flexible cleaning bars is disposed on said outer surface.

22. The crop baling system of claim 20 wherein each bar of said first set of cleaning bars is in a zigzag pattern.

23. A crop bailing system, comprising:

a baling machine operable to form round crop bales, said baling machine having a plurality of rollers:

an elongated elastomeric belt being in contact with said rollers, said elastomeric belt having an inner surface and an outer surface;

at least one set of flexible cleaning bars disposed on said elastomeric belt for performing at least one of the functions of cleaning said rollers and urging said crop into a round bale; and a portion of said elongated elastomeric belt devoid of said cleaning bars, wherein said set of cleaning bars comprises:
a central bar;
a first subset of secondary bars disposed on said belt to a first side of said central bar; and
a second subset of secondary bars disposed to a second and opposite side of said central bar.

24. The crop baling system of claim 23, wherein said first subset of secondary bars comprises a first end bar and said second subset of secondary bars comprises a second end bar.

25. The crop baling system of claim 24, wherein said first subset comprises:

said first end bar;

and a first intermediate bar disposed between said first end bar and said central bar; and wherein said second subset comprises said second end bar, and a second intermediate bar between said second end bar and said central bar.

26. The crop baling system of claim 25, wherein the length and height of a first given bar from said first subset is less than the lengths of the said bars from said first subset that are disposed closer to said central bar than said first given bar and greater than the lengths of said bars from said first set that are disposed farther from said central bar than said first given bar;

and the length and height of a second given bar from said second subset is less than the lengths of the said bars from said second subset that are disposed closer to said center bar than said second given bar and greater than the lengths of said bars from said second subset that are disposed farther from said center bar than said second given bar.

* * * * *